Feb. 2, 1965
A. F. JOHNSON
3,168,394
PURIFICATION OF ALUMINUM
Filed May 10, 1962
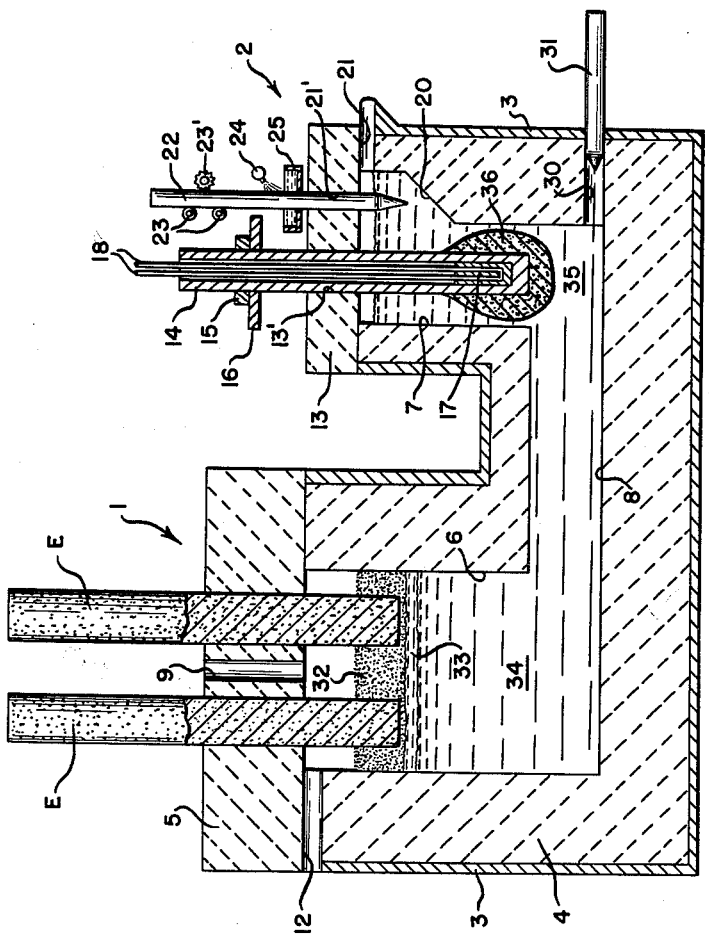
INVENTOR
Arthur F. Johnson
BY Pennie, Edmonds,
Morton, Barrows & Taylor.
ATTORNEYS United States Patent Office 3,168,394
Patented Feb. 2, 1965

3,168,394
PURIFICATION OF ALUMINUM
Arthur F. Johnson, 235 E. 42nd St., 27th Floor,
New York, N.Y.
Filed May 10, 1962, Ser. No. 193,712
5 Claims. (Cl. 75—68)

This invention relates to the production and purification of aluminum, and has for its object the provision of an improved process for reducing ores or other compounds, especially oxidic compounds of aluminum, by electrothermal reduction and the recovery of commercially pure aluminum by crystallization from the reduced metal. More particularly, the invention provides a process and apparatus for reducing oxidic aluminum material by means of a carbonaceous reducing agent from a slag or fusion of the material heated in an electric arc furnace, the formation of an alloy solution of the aluminum which is heavier than either the slag or the aluminum, and the crystallization of the aluminum and its recovery as a commercially pure metal.

The process of the invention effects the reduction at a high temperature of aluminum from oxidic raw material over a body of heavy metal aluminum alloy which has the capacity of dissolving the aluminum reduced from the oxidic material, and continuously crystallizing the heavy alloy from the aluminum in an area where the temperature is lower than the temperature of the reduction and recovering the remaining aluminum. The invention accordingly provides a process for transferring reduced aluminum into a heavy metal alloy of aluminum at an interface between the reduced aluminum and the heavy metal alloy at a high temperature at which the heavy metal and aluminum will dissolve in considerable proportions, cooling the heavy metal alloy at a place remote from the interface to a temperature at which the heavy metal alloy crystallizes, and continuously removing the aluminum or an aluminum alloy from the low temperature area.

It has been known since the Cowles process of 1885 (Patent 324,658) that aluminum alloys could be produced by the electrothermal reduction of aluminous-carbonaceous mixtures. However, electrothermal processes have not attained commercial use because the alloys were not produced economically and were not high enough in aluminum content and low enough in other metals.

The process of my invention is advantageously carried out in a compartmented furnace comprising an electrically heated part where the reduction is performed at high temperature on an aluminous-carbonaceous fusion overlying an aluminum alloy made heavier than the fusion by alloying the reduced aluminum with a metal heavier than aluminum and of much higher melting point. The furnace includes a refining part which receives the aluminum alloy from the reduction part in which the heavy metal alloy is cooled and crystallized to separate aluminum from the heavy metal aluminum alloy. This cooling, crystallizing and separating is preferably done by suspending in the heavy metal aluminum alloy in the refining part of the furnace a cooling means which can be rotated and moved upward and downward. The heavy metal alloy in contact with the cooling means freezes out on the cooling means as a deposit relatively rich in the heavy metal which deposit is from time to time removed as by temporarily discontinuing the cooling and simultaneously lowering the cooling means into a hotter zone of the heavy metal alloy. From this refining part of the furnace an alloy rich in aluminum (commercially pure) is removed.

In accordance with the process of my invention I provide in a modified electric arc furnace, for example a three-phase arc furnace of the Heroult type, a molten body of a heavy metal aluminum alloy and an overlying fusion or slag containing alumina, or a slag such as calcium aluminate, aluminum silicate or titanium aluminate (with or without addition agents such as magnesium oxide) and carbon such as coke or petroleum coke to reduce the oxides, and heat the slag to reducing temperature by arcs applied to the slag or electrical conduction through the slag to reduce aluminum. The reducing operation is preferably carried out in a combination furnace of my invention which includes an electric arc furnace for confining a molten heavy metal alloy of aluminum, such as an aluminum alloy of iron or a titanium, beneath the slag to maintain a continuous interface contact of the aluminum alloy of the heavier metal. The aluminum reduced from the slag dissolves in the underlying heavy metal aluminum alloy and by diffusion enriches this alloy in aluminum. The invention includes means for moving the heavy metal alloy into another part of the furnace which is operated at a lower temperature in which means are provided for separating the aluminum by crystallizing out of solution the heavy metal alloy leaving a solution rich in aluminum from which commercially pure aluminum recovered.

The most suitable heavy metals are those in which the aluminum-rich alloys of the heavy metals in cooling to crystallize out heavy metal alloy leaving metal richer in aluminum do not form a eutectic although peritectics may be encountered in the phase diagram of the freezing curve. An exception is the eutectic composed of aluminum and less than 2% iron which is a valuable commercial alloy. Examples of metals besides titanium and iron which may be alloyed with aluminum in the practice of the invention are vanadium, zirconium, molydenum, manganese, chromium, cobalt, boron and tungsten or mixtures of these metals.

The apparatus of the invention comprises a reduction furnace having a vessel for a molten heavy metal alloy means for maintaining a slag over the molten alloy including means for heating the slag by electrical conduction and with electric arcs, an adjoining or contiguous refining furnace having a vessel for receiving the heavy metal alloy and lowering the temperature of a part of the heavy metal alloy to a temperature at which the heavy metal alloy crystallizes, and means for removing the aluminum, preferably crystallized from the crystallized heavy metal alloy.

These and other novel features of the invention will be better understood after considering the following discussion with reference to the accompanying drawing which is a vertical sectional view of one embodiment of apparatus of the invention which may be used in carrying out a process of the invention.

The apparatus illustrated comprises two main parts: a reduction electric arc furnace part 1, and a refining furnace part 2 connected to the lower portion of part 1. The electric furnace part 1 and the refining furnace part 2 are supported by and confined within a steel shell 3. Both parts 1 and 2 are preferably cylindrical in cross-section and are lined with a refractory material 4 consisting, for example, of magnesia, silica, fused alumina or the like. The shell 3 forms the bottom and the supporting structure for the entire apparatus. The roof 5 of part 1 may be made of any suitable refractory such as silica bricks and has three holes through which the graphite electrodes E are depending (one electrode not shown in this view). These electrodes are preferably connected to any suitable source of three-phase current as is well known in steel melting furnaces. The reduction furnace may have multiples of three-phase-electrode units, such as six, nine or twelve electrodes.

The refractory 4 is shaped to provide a vessel 6 for confining the alloy and slag of the arc furnace, a vessel 7 for the metal undergoing refining and a passageway or duct 8 for the flow of metal from the reduction furnace vessel 6 into the refining vessel 7. The roof 5 has a centrally located opening 9 for feeding into vessel 6 a mixture of aluminum oxidic material, for example alumina, and a carbonaceous reducing agent such as coal or coke. Feeding devices (not shown) prevent entrance of atmospheric air into the furnace and prevent outflow of carbon monoxide through the furnace roof. At any convenient place in the upper part of the reduction furnace an aperture 12 is provided for the escape of carbon monoxide gas or fumes which aperture is connected to suitable gas disposal means (not shown).

The refining part of the furnace 2 has a refractory roof 13 having a hole 13' through which the hollow cylinder 14 is inserted vertically. This cylinder may be formed of cast iron or graphite and is supported by an annular collar 15 which makes bearing contact with the base 16. Any suitable means such as gears may be used to rotate the cylinder 14 and it may be raised or lowered by cable or rod means attached to the base 16. The cylinder is hollow but closed at the lower end and has mounted therein and fitted snugly thereto a copper or bronze cooling member 17 through which cooling water is circulated by means of pipes 18.

The vessel 7 has a lateral enlargement or extension 20 with a contiguous part or overflow tap hole 21. The roof has another hole 21' through which an aluminum rod 22 is supported by rollers 23 and a driven pressure roller 23' which moves the rod 22 upward at a controlled rate. The rod 22 is cooled by water sprays 24 and the water is caught in the launder 25. The lower end of rod 22 dips into the alloy in the enlargement 20 and as aluminum crystallizes on this rod it is removed upwardly at the rate of its accretionary elongation by crystal growth. The lower part of vessel 7 has a tap hole 30 closed with a plug 31 through which the alloy may be removed. As an alternate to the casting of aluminum on rod 22, I may remove molten aluminum of somewhat lesser purity than the aluminum of rod 22 through the port 21. When not in use the port 21 is plugged.

A process of the invention is carried out in the apparatus of the drawings as follows: At the start of the operation it will be assumed that the vessels 6 and 7 and duct 8 filled with a heavy metal alloy of one of the aforementioned metals. The minimum amount of heavy metal should be such that the specific gravity of the resulting alloy is either greater than 4 or greater than the specific gravity of the aluminous fusion.

A particulate mixture of an aluminum oxide-bearing material, for example alumina, and coal or coke, preferably petroleum coke, is fed at the required rate through hole 9 and into the vessel 6 where it accumulates around the electrodes as a mass 32 and floats on the freshly reduced aluminum 33 over the heavy metal alloy 34. To secure these results the electrodes E may be operated in such proximity to the heavy metal alloy 34 so that most of the current travels between the electrodes and the metal. Since the temperature at the interface of the aluminum 33 and the heavy metal alloy 34 may vary from 1900° C. to 2600° C. the aluminum can dissolve the heavy metal in large proportions. In view of the solubility of the aluminum in the heavy metal alloy the aluminum-rich layer 33 may not be well defined and for practical purposes one may consider that the fusion or slag is in interface contact with alloy 34. The alloy 34 in vessel 6 is relatively heavy with respect to the fusion or slag 32 and pure aluminum. As the alloy 34 flows through duct 8 into vessel 7 it loses heat and the temperature drops materially to about 1500° C. at the base of vessel 7 which must be higher than the temperature at which the alloy eutectic freezes. For titanium-aluminum this would be about 1460° C.

The cooling cylinder 14 dips into the alloy 35 in the lower part of vessel 7. In treating an aluminum-titanium alloy, for example, there is accumulated on the cylinder 14 an alloy which is largely Ti—Al₃ or similar titanium-rich alloys. As a result the metal in the upper part of vessel 7 becomes rich in aluminum and contains only a fraction of one percent of titanium. Near the freezing temperature of aluminum, at 665° C. only 0.15% of titanium dissolves in aluminum and at 654° C. only 1.8% of iron dissolves in aluminum. Since the casting rod 22 is maintained below the melting point of aluminum, usually from about 200° to 600° C., relatively pure aluminum freezes on the rod containing about 0.15% or less of titanium together with small amounts of metal impurities from the materials used in the process. As this rod increases by accretion it is pulled upwardly and, from time-to-time sections are cut off. The rod is cooled with a water spray 24 to maintain the temperature at the lower end considerably below 665° C. From time to time as a body 36 of alloy rich in titanium accumulates on the lower end of cylinder 14 and reaches a predetermined size, the cooling water circulated through the member 17 is temporarily stopped and the cylinder is lowered into the hotter regions of the alloy in vessel 7 and the titanium-rich alloy melts and is redissolved thereby replenishing the heavy metal alloy in titanium. In the duct 8 there is a migration of titanium into the alloy 34 in vessel 6 and a migration of aluminum into the alloy 35 in vessel 7. This migration tends to establish an equilibrium which maintains alloy 34 in a capacity to dissolve the aluminum reduced from the fusion 31 and to maintain aluminum in alloy 35 of vessel 7 for freezing out on rod 22. In one variation of the process, the plug 31 may be removed from time-to-time and the titanium-rich alloy tapped into a ladle and then poured into the vessel 6. Other mechanical means may be used to return titanium-rich alloy to vessel 6.

When iron is used as the heavy metal for alloying with aluminum the operating temperature at the fusion interface with the alloy 34 is from 1900° to 2600° C. while the temperature at the lower end part of vessel 7 in alloy 35 is about 1300° C. At this temperature an alloy of aluminum rich in iron freezes out on the cylinder 14 and accumulates as shown. As previously described, this cylinder is rotated and is periodically lowered into the hotter metal, after shutting off the cooling water flowing through the cooler 17 to melt off the iron-rich aluminum alloy. Other heavy metal alloys of the aforementioned metal may be in a manner similar to the treatment with titanium or iron.

I claim:

1. The process of producing commercially pure aluminum which comprises heating in an electric arc reduction furnace a body of a fused mixture of an aluminum oxidic material and a carbonaceous reducing agent over an underlying body of molten alloy of aluminum and a heavy metal, said heavy metal being a metal of the group consisting of boron, cobalt, chromium, iron, manganese, molybdenum, titanium, tungsten, vanadium and mixtures thereof and being in an amount such as to form an alloy with aluminum having a specific gravity of at least 4 maintaining a temperature at the interface of the fused material and the heavy metal alloy at from 1500° C. to 2600° C. at which temperature aluminum and the heavy metal are soluble in each other in large proportions, reducing aluminum from the aluminum oxidic material, the reduced aluminum dissolving in the heavy metal, as the body of heavy metal alloy increases due to the incorporation of reduced aluminum therein continuously passing through an enclosed duct liquid aluminum-enriched heavy metal alloy into a refining furnace and cooling the alloy therein to a temperature at which heavy metal alloy crystallizes out leaving an aluminum-rich alloy, further cooling in the refining furnace a portion of the aluminum-rich alloy and crystallizing out commercially pure aluminum, recovering the commercially pure aluminum, and returning the heavy metal alloy from the refining furnace to the reduction furnace.

2. In the process of claim 1, continuously introducing into the reduction furnace a mixture of alumina and coke, accumulating the mixture around the electrodes of an electric arc furnace, fusing and reacting the mixture at the interface with the molten heavy metal alloy by electric current flowing between the electrodes.

3. The process of producing commercially pure aluminum which comprises treating in a reducing stage in an electric reduction furnace a body of a fused mixture of an aluminum oxidic material and carbonaceous reducing agent and an underlying body of molten alloy of aluminum and a heavy metal of the group consisting of boron, cobalt, chromium, iron, manganese, molybdenum, titanium, tungsten, vanadium and mixtures thereof, heating the mixture at the interface thereof with the heavy metal alloy to from 1500° C. to 2600° C. at which temperature aluminum and the heavy metal are soluble in large proportions, reducing aluminum from the aluminum oxidic material, the reduced aluminum dissolving in the heavy metal, as the body of heavy metal alloy increases due to the incorporation of reduced aluminum therein continuously passing through an enclosed duct liquid aluminum-enriched alloy to a refining furnace, cooling the aluminum-enriched alloy in the refining furnace to a temperature at which heavy metal alloy crystallizes out leaving liquid alloy rich in aluminum, further cooling in the refining furnace a portion of the aluminum-rich alloy and crystallizing out commercially pure aluminum, recovering the commercially pure aluminum, remelting the crystallized heavy metal alloy and returning the heavy metal alloy to the reduction furnace by migration through said enclosed duct.

4. In the process of claim 3, inserting a cooling member into the liquid aluminum enriched alloy in the refining furnace and freezing thereon said heavy metal alloy.

5. In the process of claim 4, periodically melting said heavy metal alloy on the cooling member and returning the melted heavy metal alloy to the reduction furnace.

References Cited in the file of this patent

UNITED STATES PATENTS

| | | |
|---|---|---|
| 324,659 | Cowles | Aug. 18, 1885 |
| 1,019,531 | Rossi | Mar. 5, 1912 |
| 2,255,549 | Kruh | Sept. 9, 1941 |
| 2,294,546 | Gentil | Sept. 1, 1942 |
| 2,382,723 | Kirsebom | Aug. 14, 1945 |
| 2,621,120 | Pedersen | Dec. 9, 1952 |
| 2,829,961 | Miller | Apr. 8, 1958 |
| 2,998,335 | Dehmelt | Aug. 29, 1961 |

OTHER REFERENCES

Smithells: Metals Reference Book, vol. I, Interscience Publishers, Inc., N.Y., 1955, pages 318, 320 and 323 relied on.